(12) United States Patent
Zhang et al.

(10) Patent No.: US 11,929,066 B2
(45) Date of Patent: Mar. 12, 2024

(54) INTENT-BASED CONVERSATIONAL KNOWLEDGE GRAPH FOR SPOKEN LANGUAGE UNDERSTANDING SYSTEM

(71) Applicant: PwC Product Sales LLC, New York, NY (US)

(72) Inventors: Yizhuo Zhang, Shanghai (CN); Walter Quesada, Pembroke Pines, FL (US); Thomas J. Foth, Melrose, MA (US); Ernesto Valdes Forte, Arlington, VA (US); Jun Li, Shanghai (CN)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 17/065,724

(22) Filed: Oct. 8, 2020

(65) Prior Publication Data

US 2021/0104234 A1 Apr. 8, 2021

Related U.S. Application Data

(60) Provisional application No. 62/912,385, filed on Oct. 8, 2019.

(51) Int. Cl.
*G10L 15/197* (2013.01)
*G10L 15/06* (2013.01)

(52) U.S. Cl.
CPC .......... *G10L 15/197* (2013.01); *G10L 15/063* (2013.01); *G10L 2015/0631* (2013.01)

(58) Field of Classification Search
CPC ................ G10L 15/197; G10L 15/063; G10L 2015/0631; G06N 5/02; G06F 40/30
See application file for complete search history.

(56) References Cited

U.S. PATENT DOCUMENTS

| 11,205,052 B2* | 12/2021 | Sapugay | G06F 40/216 |
| 2017/0024375 A1* | 1/2017 | Hakkani-Tur | G06F 16/337 |
| 2018/0052913 A1* | 2/2018 | Gaskill | G06N 5/02 |

(Continued)

OTHER PUBLICATIONS

International Search Report and Written Opinion dated Jan. 22, 2021, directed to International Application No. PCT/US2020/054682; 12 pages.

*Primary Examiner* — Pierre Louis Desir
*Assistant Examiner* — Keisha Y. Castillo-Torres
(74) *Attorney, Agent, or Firm* — Morrison & Foerster LLP

(57) ABSTRACT

Described are systems, methods, apparatuses, and computer program product embodiments for automatically processing intent-based spoken language for SLU. The disclosed solution uses a scale-free network structured conversational knowledge graph that stores nodes representative of actions, objects, and intent names and edges representative of relationships between the nodes. For all phrases (including a sentence) from the same intent, the system calculates a mean feature vector using a Universal Sentence Embedding (USE) model as a feature element. The system also employs a multi-step intent detection strategy. A graph query technique may be used to match all potential intent nodes from the trained knowledge graph. The system may compute a covariance matrix between the feature element of an input phrase and feature elements of all potential intents. The major component of the covariance matrix along with the maximum covariance may be used to determine the final intent.

4 Claims, 11 Drawing Sheets

(56) References Cited

U.S. PATENT DOCUMENTS

| | | | | |
|---|---|---|---|---|
| 2018/0067923 | A1* | 3/2018 | Chen | G06F 40/30 |
| 2019/0236205 | A1* | 8/2019 | Jia | G06F 16/3329 |
| 2019/0258723 | A1* | 8/2019 | Taycher | G06F 16/24578 |
| 2019/0377790 | A1* | 12/2019 | Redmond | G06F 40/35 |
| 2020/0057946 | A1* | 2/2020 | Singaraju | G06N 5/025 |

* cited by examiner

INTENT-BASED CONVERSATIONAL KNOWLEDGE GRAPH FOR SPOKEN LANGUAGE UNDERSTANDING SYSTEM

CROSS-REFERENCE TO RELATED APPLICATIONS

This application claims the benefit of U.S. Provisional Application No. 62/912,385, filed Oct. 8, 2019, the entire contents of which are incorporated herein by reference.

FIELD

This disclosure relates generally to systems and methods for understanding intent-based conversations and, more specifically, for determining a user's intent of a user input phrase using a knowledge graph.

BACKGROUND

Natural language processing (NLP) may involve programming a system, such as a computer, to understand how to process and analyze language communicated from a human user. One area of NLP is spoken language understanding (SLU). SLU can help a machine process text and speech, understand meanings, and make integration with knowledge responses on a dialog system. For example, a system can use SLU to understand what the user is asking in a customer service chat session. The system may be a Chatbot customized to specifically understand intent-based questions and answers for business intelligence applications. Such application, among others, may benefit from the SLU system having a strong capacity of understanding how users make queries.

Conventional SLU systems may be designed to extract a meaning from a user's speech/text utterances, but their applications may be vast and broad. For example, commercial and academic sectors use applications such as voice searching in mobile devices and meeting user summarization. However, extracting metadata (e.g., intents, entities, relations, semantic roles, etc.) from content may still be a challenging problem, specifically in artificial intelligence, pattern recognition, and machine learning systems. The problem is especially challenging when automation is involved.

Multiple methods have been previously or are currently being used to extract information such as the user's intent of a user input phrase. One method involves supervised learning. In some embodiments, user input (e.g., a sentence) and the processed results (e.g., intent) are associated together and manually labeled. The system collects manually labeled training data and uses it to train a classifier through machine learning or deep learning to predict possible intents. However, the amount of manually labeled training data may be large. Additionally, the predicted possible user intents is limited to within the scope of the already-associated pairs.

Another method for extracting information from a user input phrase involves pattern matching. The system is programmed to match the lexical and syntactic patterns in the user input phrase. The lexical and syntactic patterns are extracted from a list of possible input dataset. This type of system is limited as pre-built patterns may not automatically cover new topics or intent. Further, human language may be complex with numerous semantics that may lead to unmatched pattern results. As such, the system cannot effectively handle new or all topics/intent, leading to a compromise in the accuracy of the processed results.

Accordingly, SLU systems may benefit from a solution capable of automatically expanding its topic/intent capabilities and may further benefit from a solution that can obtain higher accuracy with requiring less training data.

SUMMARY

As described above, systems that understand spoken language may benefit from automatic topic/intent space expansion, higher accuracy, and requiring training data. To address the problems noted above, the disclosed embodiments describe system, method, apparatus, and computer program product embodiments for automatically processing intent-based spoken language for SLU. The disclosed solution creates, modifies, and uses a scale-free network structured conversational knowledge graph that stores nodes representative of actions, objects, slots, and intent names, along with edges representative of relationships between the nodes.

In some embodiments, for each phrase from the same intent, the system calculates a mean feature vector using a Universal Sentence Embedding (USE) model as a feature element. The system also employs a multi-step intent detection strategy. A graph query technique may be used to match all potential intent nodes from the trained knowledge graph. The system may compute a covariance matrix that represents the covariance between the feature element of an input phrase and feature elements of phrases of all potential intents. The major component of the covariance matrix along with the maximum covariance may be used to determine the final intent.

By using such a conversational knowledge graph, the system can automatically expand its topic/intent capabilities. The system may also determine the final intent of the spoken language using less training data (e.g., small-sized training sets) and with higher accuracy compared to other platforms for conversational interfaces. The disclosed SLU systems and methods can be used for applications such customizing a Chatbot (e.g., an intelligible Q&A system) by a developer.

In some embodiments, a method for training a spoken language understanding (SLU) system is provided, the method comprising: receiving one or more phrases; creating a knowledge graph, the creation comprising: determining one or more words in the one or more phrases, adding one or more nodes to the knowledge graph, the one or more nodes corresponding to the one or more words in the one or more phrases, determining one or more intents of the one or more phrases, adding one or more intent nodes to the knowledge graph, the one or more intent nodes corresponding to the one or more determined intents, adding one or more edges to the knowledge graph, and using the one or more edges to form connections between the one or more determined intents and the corresponding one or more words; and wherein the SLU system is configured to determine an intent of a user input phrase using the connections between the one or more determined intents and the corresponding one or more words.

In some embodiments of the method for training a spoken language understanding (SLU) system: the method further comprising: receiving a user input phrase; determining whether the knowledge graph includes an intent node corresponding to the user input phrase; and in accordance with the determination that the knowledge graph does not include the intent node corresponding to the user input phrase, adding the intent node and adding one or more additional nodes representative of words in the user input phrase to the knowledge graph.

In some embodiments of the method for training a spoken language understanding (SLU) system: the creation of the knowledge graph comprises: for each of the one or more phrases: performing lemmatization on the respective phrase to reduce the phrase; tagging parts of speech in the reduced phrase; extracting action words and forming an action list; and extracting object words and forming an object list, wherein the one or more nodes added to the knowledge graph correspond to the extracted action words and the extracted object words.

In some embodiments of the method for training a spoken language understanding (SLU) system: the one or more nodes include one or more of: action nodes corresponding to action words, object nodes corresponding to object words, and entity nodes corresponding to entity names.

In some embodiments, a method for determining an intent of a user input phrase is provided, the method comprising: receiving the user input phrase; and searching a knowledge graph for one or more matching nodes, the one or more matching nodes corresponding to one or more words in the user input phrase and the intent of the user input phrase, wherein the knowledge graph comprises: a plurality of nodes comprising one or more of: one or more action nodes representing one or more action words, one or more object nodes representing one or more object words, and one or more intent nodes representing one or more intents, and a plurality of edges connecting at least two of the plurality of nodes and representing a plurality of relationships between the connected nodes.

In some embodiments of the method for determining an intent of a user input phrase: the method further comprising: determining whether the knowledge graph includes an intent node corresponding to the user input phrase; and in accordance with the determination that the knowledge graph does not include the intent node corresponding to the user input phrase, adding the intent node and adding one or more additional nodes representative of words in the user input phrase to the knowledge graph.

In some embodiments of the method for determining an intent of a user input phrase: the search of the knowledge graph comprises: performing a first check to generate a potential intent list; and performing a second check to determine the intent of the user input phrase using the potential intent list.

In some embodiments of the method for determining an intent of a user input phrase: the performance of the first check includes: determining whether the one or more matching nodes are included in the knowledge graph; in accordance with the determination that the one or more matching nodes are included in the knowledge graph, adding the corresponding word to a pending list; and using the pending list to generate the potential intent list.

In some embodiments of the method for determining an intent of a user input phrase: using the pending list to generate the potential intent list includes: for each word in the pending list, determining whether a matching edge is included in the knowledge graph; and in accordance with the determination that the matching edge is included in the knowledge graph, adding the corresponding potential intent to the potential intent list.

In some embodiments of the method for determining an intent of a user input phrase: the performance of the second check includes: for each potential intent in the potential intent list, determining one or more feature vectors of the respective potential intent; determining a feature vector of the user input phrase; computing a covariance matrix using the one or more feature vectors of the potential intents in the potential intent list and the feature vector of the user input phrase; finding a maximum value of the covariance matrix; and determining the intent of the user input phrase based on the maximum value of the covariance matrix.

In some embodiments of the method for determining an intent of a user input phrase: the method further comprising: performing lemmatization on the user input phrase to reduce the phrase; tagging parts of speech in the reduced phrase; and using the reduced phrase to extract the one or more words in the user input phrase.

In some embodiments, a system for determining an intent of a user input phrase is provided, the system comprising one or more processors and a memory, wherein the one or more processors are configured to execute instructions stored on the memory to cause the system to: receive the user input phrase; and search a knowledge graph for one or more matching nodes, the one or more matching nodes corresponding to one or more words in the user input phrase and the intent of the user input phrase, wherein the knowledge graph comprises: a plurality of nodes comprising one or more of: one or more action nodes representing one or more action words, one or more object nodes representing one or more object words, and one or more intent nodes representing one or more intents, and a plurality of edges connecting at least two of the plurality of nodes and representing a plurality of relationships between the connected nodes.

In some embodiments of the system for determining an intent of a user input phrase: the plurality of nodes of the knowledge graph further comprises one or more entity nodes representing one or more entity names.

In some embodiments of the system for determining an intent of a user input phrase: the instructions stored on the memory to cause the system to search the knowledge graph causes the system to: perform a first check to generate a potential intent list; and perform a second check to determine the intent of the user input phrase using the potential intent list.

In some embodiments of the system for determining an intent of a user input phrase: the instructions stored on the memory to cause the system to perform the first check causes the system to: determine whether the one or more matching nodes are included in the knowledge graph; in accordance with the determination that the one or more matching nodes are included in the knowledge graph, add the corresponding word to a pending list; and use the pending list to generate the potential intent list.

In some embodiments of the system for determining an intent of a user input phrase: the instructions stored on the memory to cause the system to use the pending list to generate the potential intent list causes the system to: for each word in the pending list, determine whether a matching edge is included in the knowledge graph; and in accordance with the determination that the matching edge is included in the knowledge graph, add the corresponding potential intent to the potential intent list.

In some embodiments of the system for determining an intent of a user input phrase: the instructions stored on the memory to cause the system to perform the second includes: for each potential intent in the potential intent list, determine one or more feature vectors of the respective potential intent; determine a feature vector of the user input phrase; compute a covariance matrix using the one or more feature vectors of the potential intents in the potential intent list and the feature vector of the user input phrase; find a maximum value of the covariance matrix; and determine the intent of the user input phrase based on the maximum value of the covariance matrix.

In some embodiments of the system for determining an intent of a user input phrase: the knowledge graph is created by: receiving one or more phrases; for each of the one or more phrases: performing lemmatization on the respective phrase to reduce the phrase; tagging parts of speech in the reduced phrase; extracting action words and forming an action list; and extracting object words and forming an object list, wherein the one or more nodes added to the knowledge graph correspond to the extracted action words and the extracted object words.

In some embodiments of the system for determining an intent of a user input phrase: the knowledge graph includes a first layer and a second layer, the first layer including the one or more intent nodes, and the second layer including the one or more object nodes.

In some embodiments, a non-transitory computer-readable storage medium for determining an intent of a user input phrase is provided, the non-transitory computer-readable storage medium storing instructions that, when executed by one or more processors of a spoken language understanding (SLU) system, cause the one or more processors of the SLU system to: create a knowledge graph, the creation comprising: a plurality of nodes comprising one or more of: one or more action nodes representing one or more action words, one or more object nodes representing one or more object words, and one or more intent nodes representing one or more intents, and a plurality of edges connecting at least two of the plurality of nodes and representing a plurality of relationships between the connected nodes, wherein the SLU system is configured to determine an intent of a user input phrase using the connections between the one or more determined intents and the corresponding one or more words.

In some embodiments, a method for creating a knowledge graph is provided, the method comprising: for each phrase of a plurality of phrases: performing tokenization on the respective phrase to determine one or more words in the respective phrase; determining one or more named entities in the one or more words; searching the knowledge graph for one or more nodes corresponding to the one or more words in the respective phrase; in accordance with the knowledge graph not having the one or more nodes, adding the one or more nodes to the knowledge graph; determining one or more intents of the respective phrase; adding one or more intent nodes to the knowledge graph, the one or more intent nodes corresponding to the one or more determined intents; searching the knowledge graph for one or more edges corresponding to one or more connections between the one or more determined intents and the one or more words in the respective phrase; and in accordance with the knowledge graph not having the one or more edges, adding the one or more edges to the knowledge graph, and using the one or more edges to form the one or more connections between the one or more determined intents and the corresponding one or more words in the respective phrase.

In some embodiments, a method for creating a knowledge graph, the method comprising: receiving a plurality of training phrases; determining one or more intents of the plurality of training phrases; adding one or more intent nodes to the knowledge graph, the one or more intent nodes corresponding to the one or more determined intents; performing Universal Sentence Embedding (USE) on the plurality of training phrases to obtain embedding vectors; perform k-means clustering on the embedding vectors; segmenting the plurality of training phrases into one or more categories; determining one or more taxonomies from the one or more categories; adding one or more taxonomy nodes to the knowledge graph, the one or more taxonomy nodes corresponding to the one or more taxonomies; extracting one or more named entities from the one or more categories; adding one or more named entity nodes to the knowledge graph, the one or more named entity nodes corresponding to the extracted named entities; adding one or more edges to the knowledge graph; and using the one or more edges to form connections between the one or more intent nodes, the one or more taxonomy nodes, and the one or more named entity nodes.

BRIEF DESCRIPTIONS OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed.

DETAILED DESCRIPTION

As discussed above, several methods have been developed to extract information, such as a user's intent, from a user input phrase. However, due to the techniques used, these methods have limited capabilities and accuracies. For example, supervised learning typically requires a large amount of manually labeled training data, where predicted possible user intents are limited to within the scope of the manually labeled training data. Pattern matching is also limited with compromised accuracy in user input phrases that do not match pre-built patterns.

The disclosed embodiments address these shortcomings. The disclosed embodiments describe systems and methods for extracting information, such as a user's intent, from an input phrase. The disclosed systems and methods use a knowledge graph to represent relationships between an intent and certain words in the user input phrase. The knowledge graph provides the system the capability of adding new representations and relationships to handle new topics/intent as they are encountered. Additionally, instead of relying on matched pairs or pre-built patterns, the system may use feature vectors to compare phrases for a given intent. The feature vectors can reduce the amount of training data required.

Described below are systems, methods, apparatuses, and computer program product embodiments for automatically processing intent-based spoken language for SLU. The disclosed solution uses a knowledge graph that stores representations of action words, object words, intents, and slots in the form of nodes and stores relationships between the words and intents by way of edges. As discussed in more detail below, the system is initialized by creating the knowledge graph using a training process.

Once the knowledge graph is created, at runtime, an intent determiner can be used to determine the intent of the user input phrase. In some embodiments, for each phrase (including a sentence) from the same intent, the system structures phrases in the form of mean feature vectors so that the phrases can be compared relatively to each other. The system employs a multi-step intent detection strategy. The system searches the previously created knowledge using a graph query technique to find the possible intents that match the user input phrase. From the possible intents, the system determines the final intent by using a covariance matrix. In some embodiments, the covariance matrix may be a matrix (of feature vectors) that represent a confidence value of the possible intents. One value in the vector may be the maximum value, which the system may use to determine the final intent.

Overview of an Exemplary Spoken Language Understanding System

Figure 1:
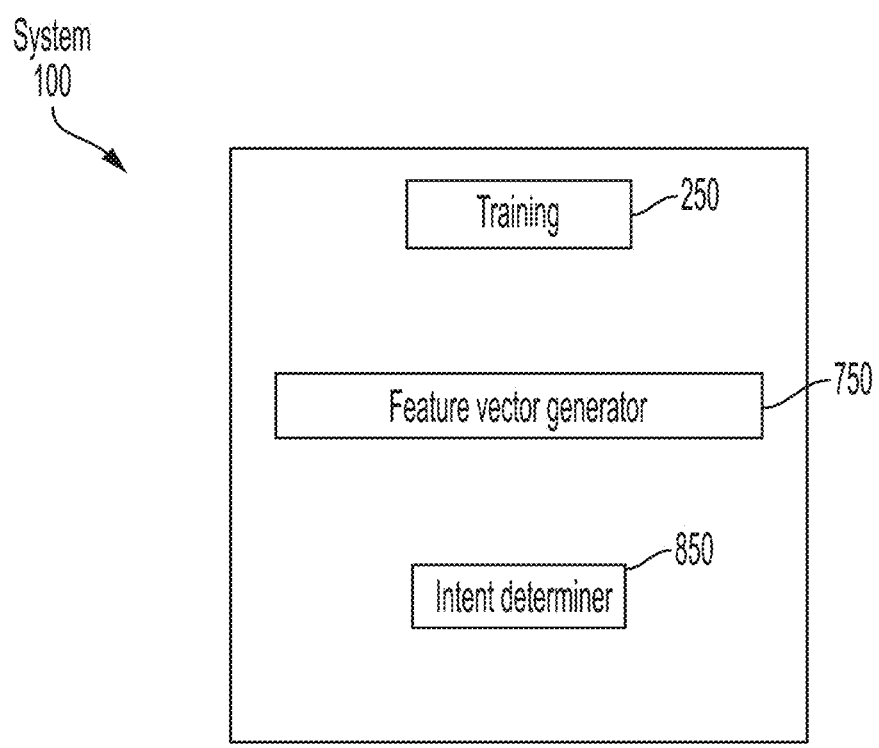
FIG. 1 illustrates a block diagram of an exemplary SLU system, according to some embodiments.

FIG. 1 illustrates a block diagram of an exemplary SLU system, according to some embodiments. The system 100 may include a plurality of blocks: training 250, feature vector generator 750, and intent determiner 850. The training block 250 can be used to create a scale-free network structure in graph database, also referred to as a knowledge graph. The knowledge graph can be used to store nodes representative of actions, objects, intent names, and slots, along with edges representative of relationships between the nodes. In some embodiments, the nodes may be logical representations of words, and the edges may be logical representations of relationships between nodes.

The feature vector generator 750 can be used to generate feature vectors and a mean feature vector using a USE model. The system may use a universal model that is pre-trained on a large corpus to plug in a classification task. The mean feature vector can be generated for all phrases from the same intent.

The intent determiner 850 can be used to determine the intent of a user input phrase (e.g., a sentence input into a graphical user interface by a user). The intent determiner 850 can utilize the knowledge graph generated in the training block 250 to generate a list of potential intents and return the final intent based on a covariance matrix.

Each of the plurality of blocks is discussed in detail below. As used throughout this disclosure, the term "phrase" refers to a plurality of words appearing next to each other. In some embodiments, the plurality of words may be two words, three words, four words, or the like. In some embodiments, the plurality of words may appear next to each other in a sentence. In some embodiments, a phrase can be any of these combinations including a whole sentence.

Exemplary Training

Figure 2:
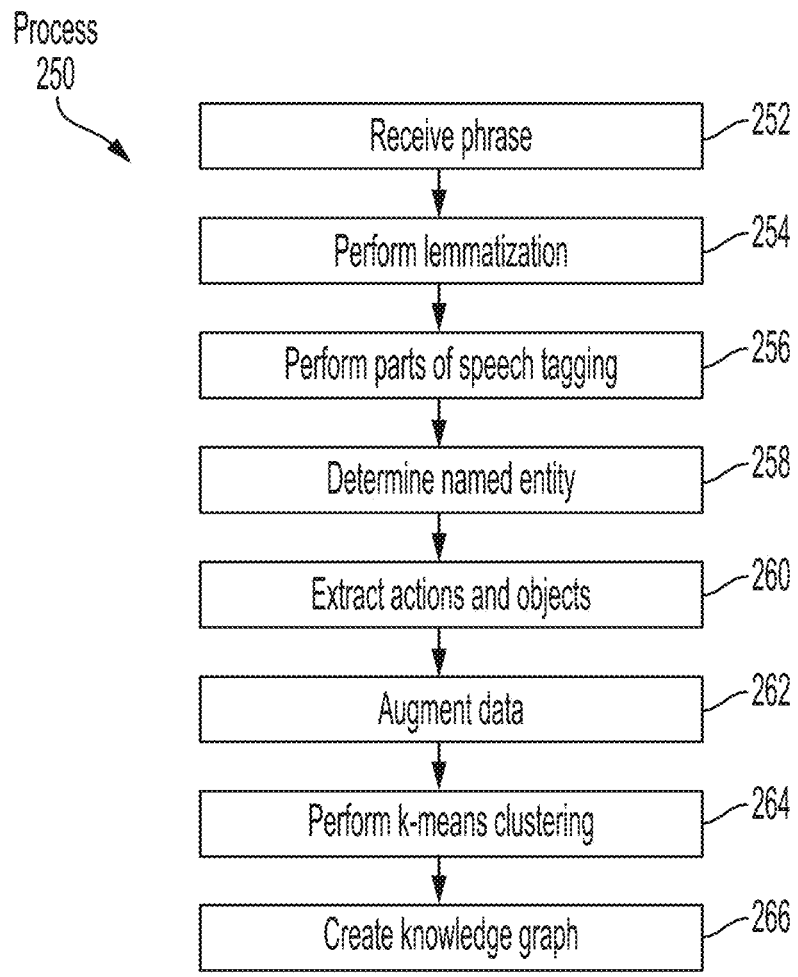
FIG. 2 illustrates an exemplary method for training a SLU system, according to some embodiments.

FIG. 2 illustrates a method for training the disclosed SLU system, according to some embodiments. Process 250 can begin by receiving one or more phrases at step 252. The phrase can be received using any type of methods such as user spoken, user typed, retrieved from a file, or the like. For example, the user may type the phrase "Booking a flight from Miami to Chicago" into a user interface dialog box. Process 250 can include a plurality of steps for data preprocessing, auto segmentation, and graph building. As discussed in more detail below, data preprocessing can include steps 254, 256, 258, and 260; auto segmentation can include steps 262 and 264; and graph building can include step 266.

In step 254, the system may perform lemmatization on individual words in the phrase. Inflectional forms and derivationally-related forms in the words may be reduced or removed resulting in a common base form (i.e., a lemma). For example, "buy," "buys," "buying," and "bought" may all have the same semantical meaning and may be reduced to the word "buy." Referring to the example phrase received in step 252, the lemmatization in step 254 may take the word "booking" and output the word "book." The resulting phrase may be "Book a flight from Miami to Chicago." In some embodiments, step 254 may be performed using any type of software such as, but not limited to, Wordnet, Concept Net, and CoreNLP.

The system may then perform parts of speech (POS) tagging, which may be also referred to as a grammatical tagging or word-category disambiguation (step 256). A word may be tagged as corresponding to a part of speech. In some embodiments, the words may be tagged by considering the context and its relationship to adjacent words, related words, or both. Exemplary parts of speech may include, but are not limited to, nouns, verbs, adjectives, and adverbs. In some embodiments, the system can perform POS tagging for different portions of the phrase. In some embodiments, a word can have several parts of speech, where syntactic and morphological analyses can be used to determine the relevant parts of speech. Referring to the example reduced phrase from step 254, step 256 may result in the tagging shown in Table 1.

TABLE 1

| Part of speech tagging on an example phrase | | | | | | | |
|---|---|---|---|---|---|---|---|
| Words in phrase | Book | a | flight | from | Chicago | to | Miami |
| Part of speech | VB | DT | NN | IN | NNP | IN | NNP | where VB can represent a verb, DT can represent a determiner, NN can represent a noun, IN can represent a proposition, and NNP can represent a proper noun.

In some embodiments, tagging bundles can be used to represent the tagging of words to parts of speech. In some embodiments, a sentence can be broken up into short phrases (or a phase can be broken into multiple, short phrases), and a N-Gram model can be used to determine the tagging bundles of short phrases. A N-Gram model can be a type of language model that predicts the next item in the sequence. In some embodiments, the N-Gram model can determine a tagging bundle based on probability estimation. As an example, performing POS tagging on the phrase "the day after tomorrow" can result in the tagging bundle: "[DT,NN, IN,NN]."

Figure 3:
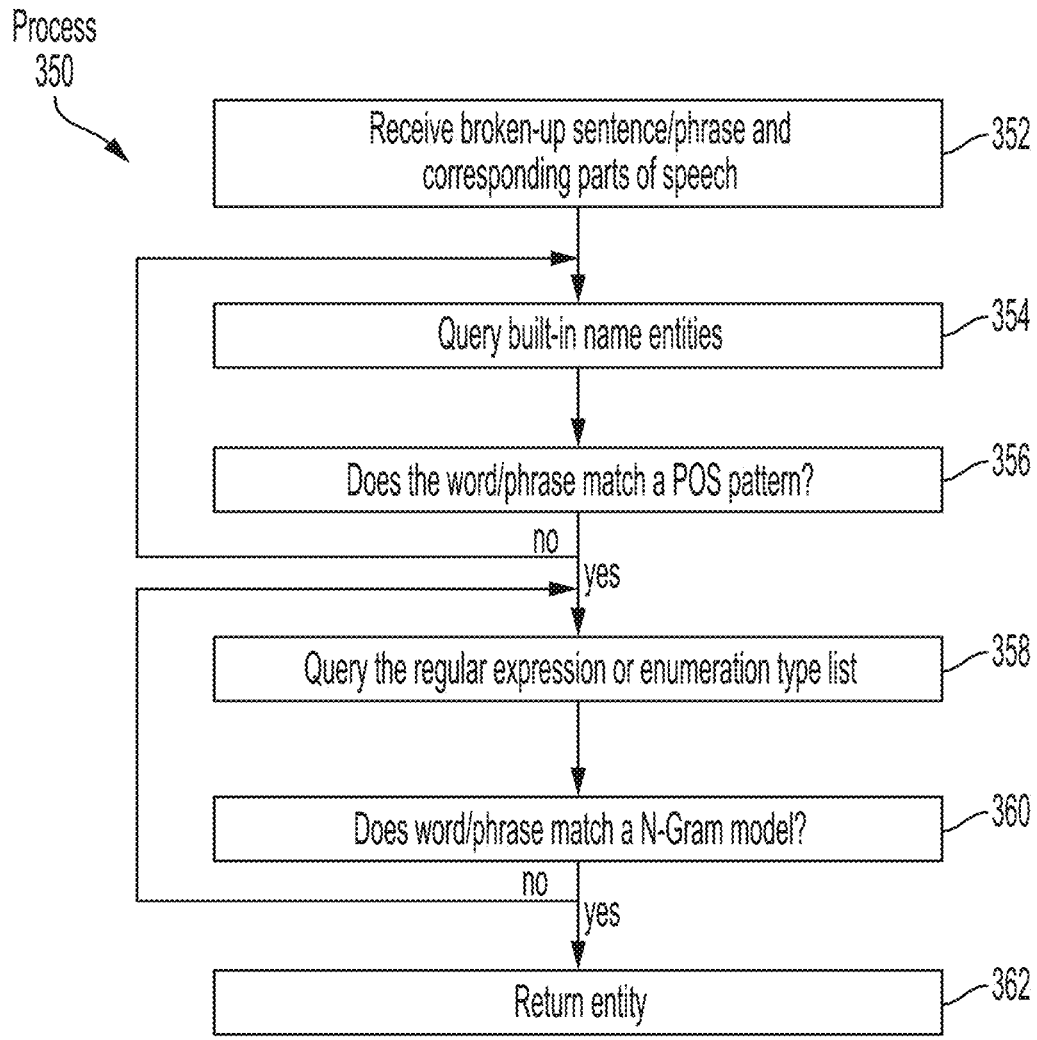
FIG. 3 illustrates an exemplary method for determining a named entity in a phrase, according to some embodiments.

In step 258, the system can determine whether there are any named entities in the phrase using a named entity recognition (NER) process. In some embodiments, the NER process can locate and classify a named entity into predetermined categories, such as person names, locations, organizations, percentages, etc. The NER process can then replace each entity that appears in the phrase. FIG. 3 illustrates a method for determining a named entity in a phrase, according to some embodiments. Step 258 may also be referred to as process 350.

Process 350 can begin at step 352 by receiving the broken-up sentence or phrase and corresponding parts of speech from, e.g., step 256 of process 250. As one example, the user-input phrase may be "Book a table the day after tomorrow," and the broken-up phrase received by process 350 may be "the day after tomorrow." The broken-up sentence/phrase can be in the form of a vector having an entry: [tokenized word|part of speech] for each word. For example, the vector for the phrase "the day after tomorrow" can appear as:

| the | DT | day | NN | after | IN | tomorrow | NN |
|---|---|---|---|---|---|---|---|

The system may include a plurality of different built-in name entities, and with the vector from step 352, the system can search the built-in name entities in step 354. In some embodiments, the system may include a plurality of different types of built-in name entities; exemplary types include, but are not limited to, enumeration or regular expression. Table 2 shown below illustrates exemplary built-in name entities, along with the corresponding type and exemplary POS tagging pattern.

TABLE 2

Example built-in name entities

| Built-in Name Entity | Type List | Exemplary POS Tagging Pattern |
|---|---|---|
| City name | Enumeration | [NNP] |
| Email | Regular expression | [JJ, NNP, NN] |
| IP | Regular expression | [CD] |
| Phone number | Regular expression | [CD], [JJ] |
| Percentage | Regular expression | [CD], [CD, NN] |
| URL | Regular expression | [NN] |
| DateTime | Enumeration | [CD], [JJ, NN], [DT, NN, IN, NN], [IN, JJ] |
| Currency | Enumeration | [CD], [CD, NNS] |
| Age | Regular expression | [CD], [CD, NNS, JJ], [CD, NNS] | where NNP can represent a proper noun, JJ can represent an adjective, NN can represent a noun, CD can represent a cardinal number, DT can represent a determiner, IN can represent a proposition, and NNS can represent a plural noun.

Searching the built-in name entities can include the system determining whether a phrase or word in the vector matches the POS tagging pattern. If the pattern does not match (step 356), then the process can return to step 354 to continue searching the built-in name entities. If there is a match (step 356), the process can proceed to step 358. In some embodiments, the system may allow the user to customize the enumeration or regular expression name entities for, e.g., specific topics.

In some embodiments, each built-in name entity can include a regular expression or enumeration type list. The system can query the regular expression or enumeration type list (step 358) corresponding to the pattern matched in step 356 and can determine whether the N-Gram of the word/phrase from step 352 matches one on the regular expression or enumeration type list (step 360). If the word/phrase does not match (step 360), the process can return to step 358 to continue querying the next regular expression or enumeration. If there is a match (step 360), the process can proceed to step 362, where the entity can be returned.

Returning to the previous example of the phrase "the day after tomorrow," the system can determine in step 356 that this phrase has a POS tagging pattern that matches one in the built-in name entity called DateTime. The system can query the regular expression or enumeration in step 358 and find a match in step 360. The entity returned in step 362 can be DATE, for example.

Returning to process 250 of FIG. 2, after determining the named entity in step 258, the system may proceed with step 260, where the system may extract actions and objects from the phrase. In some embodiments, actions may be associated with certain parts of speech, and objects may be associated with certain parts of speech. For example, actions may be associated with and extracted from verbs (i.e., VB), while objects may be associated with and extracted from nouns (i.e., NN or NNS). In some embodiments, the system may not extract actions or verbs that are named entities (e.g., determined from step 258).

In some embodiments, the system may perform a synonym replacement process in step 260. The synonym replacement process may be a data augmentation technique used to enrich actions and objects. For example, the word "book" may be augmented with "reserve."

In step 262, the system may augment data resulting from step 260. In some embodiments, data augmentation can be used to reduce redundancy and enhance the performance of knowledge discovery. Data augmentation can include creating one or more lists, such as an action list and an object list. For example, an action list can include "book," "reserve," and "retain." One example object list can include "flight," "ticket," and "trip."

Figure 4:
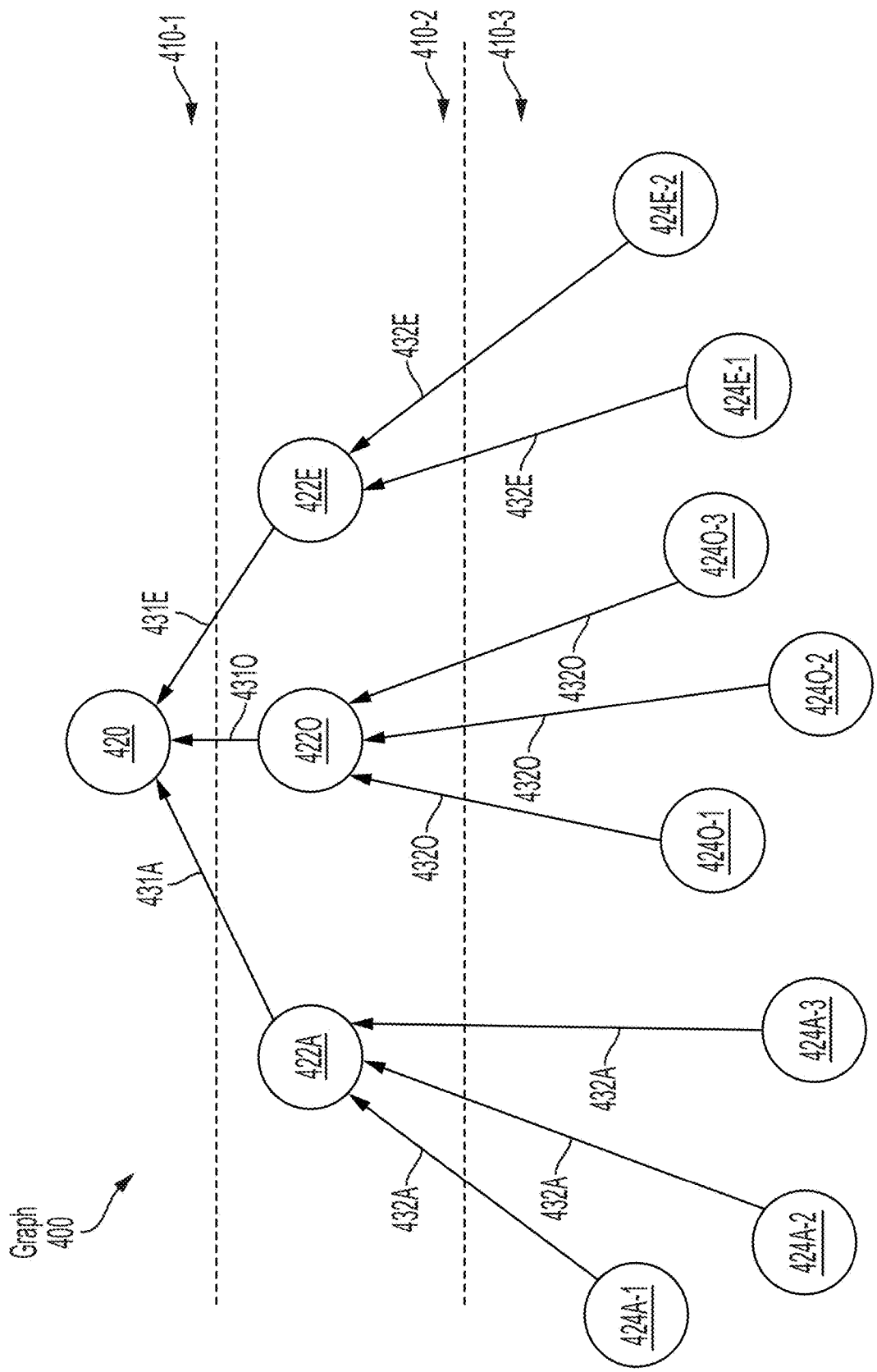
FIG. 4 illustrates a portion of an exemplary knowledge graph, according to some embodiments.

FIG. 4 illustrates a portion of an exemplary knowledge graph, according to some embodiments. The knowledge graph 400 can include a plurality of layers 410, a plurality of nodes, and a plurality of edges. The plurality of nodes can include nodes 420, 422, and 424. The first layer 410-1 can include one or more nodes 420, the second layer 410-2 can include nodes 422, and the third layer 410-3 can include nodes 424.

In some embodiments, nodes within the same layer can be the same type of nodes. For example, node 420 can be a node that represents an intent, also referred to as an intent node. Nodes 422 can be handler nodes that connect real words. Nodes 424 can be action nodes, object nodes, slot nodes, and entity nodes that represent actions, objects, slots, and entities, respectively.

The plurality of edges can connect nodes based on relationships. For example, first edges 431 can be used to connect handler nodes 422 to the intent node 420, and second edges 432 can be used to connect action nodes 424A, object nodes 424O, and entity nodes 424E to handler nodes 422. As discussed above, the connections can represent relationships between nodes. The edges may be directed or undirected. In an undirected graph, an edge from one node to another may have one meaning. In a directed graph, an edge connecting two nodes may have different meanings depending on the direction of the edge.

In some embodiments, edges may have corresponding labels based on the type of nodes the edges are connecting. Edge 431A may have an "action_of_intent" label. Edge 431O may have an "object_of_intent" label. Edge 431E may have an "entity_of_intent" label. Edges 432A may have "action_related_to" labels. Edges 432O may have "object_related_to" labels. Edges 432E may have "entity_related_to" labels. In embodiments where a node is a slot node, the corresponding edge may have "slotting" label, which may be an interdependent word.

Embodiments of the disclosure can include a knowledge graph 400 having a plurality of intent nodes 420; FIG. 4 illustrates a single intent node 420 for purposes of simplicity only. Each intent node 420 can be connected to corresponding handler nodes 422, action nodes 424A, object nodes 424O, and entity nodes 424E.

In some embodiments, the knowledge graph 400 may be a scale-free structure, which may be capable of automatically expanding to include additional intents and topics. When the system discovers a new intent/topic associated with a sentence/phrase (e.g., a user input phrase), the system may determine that the knowledge graph does not represent (i.e., include) a node corresponding to the intent. In accordance with this determination, the system may accommodate for this new intent/topic by adding corresponding nodes and edges to the graph 400. In some embodiments, the knowledge graph 400 may have a power-law distribution and a hub-and-spoke architecture.

In some embodiments, creating the knowledge graph can include taking the lists created in step 262, assigning a node 424A for each action item on the action list, and assigning a node 424O for each object item on the object list. In some embodiments, step 262 can include creating an entity list including one or more named entity items, and step 266 can include assigning a 424E node for each entity item on the named entity list.

The edge(s) 432A can added and used to connect one or more action item nodes (e.g., 424A-1, 424A-2, and 424A-3) to a corresponding action node (e.g., 422A). The edge(s) 432O can be added and used to connect one or more object item nodes (e.g., 424O-1, 424O-2, 424O-3) to a corresponding object node (e.g., 422O). The edge(s) 432E can be added and used to connect one or more entity item nodes (e.g., 424E-1, 424E-2) to a corresponding entity node (e.g., 422E).

The system may assign a node 420 for each intent. Edge(s) 431A can be added and used to connect one or more of: action node(s) 422A, object node(s) 422O, and entity node(s) 422E to the intent node 420.

Examples of the disclosure can include one or more nodes in the knowledge graph representing one or more slots.

Exemplary Learning Taxonomies

Figure 5:
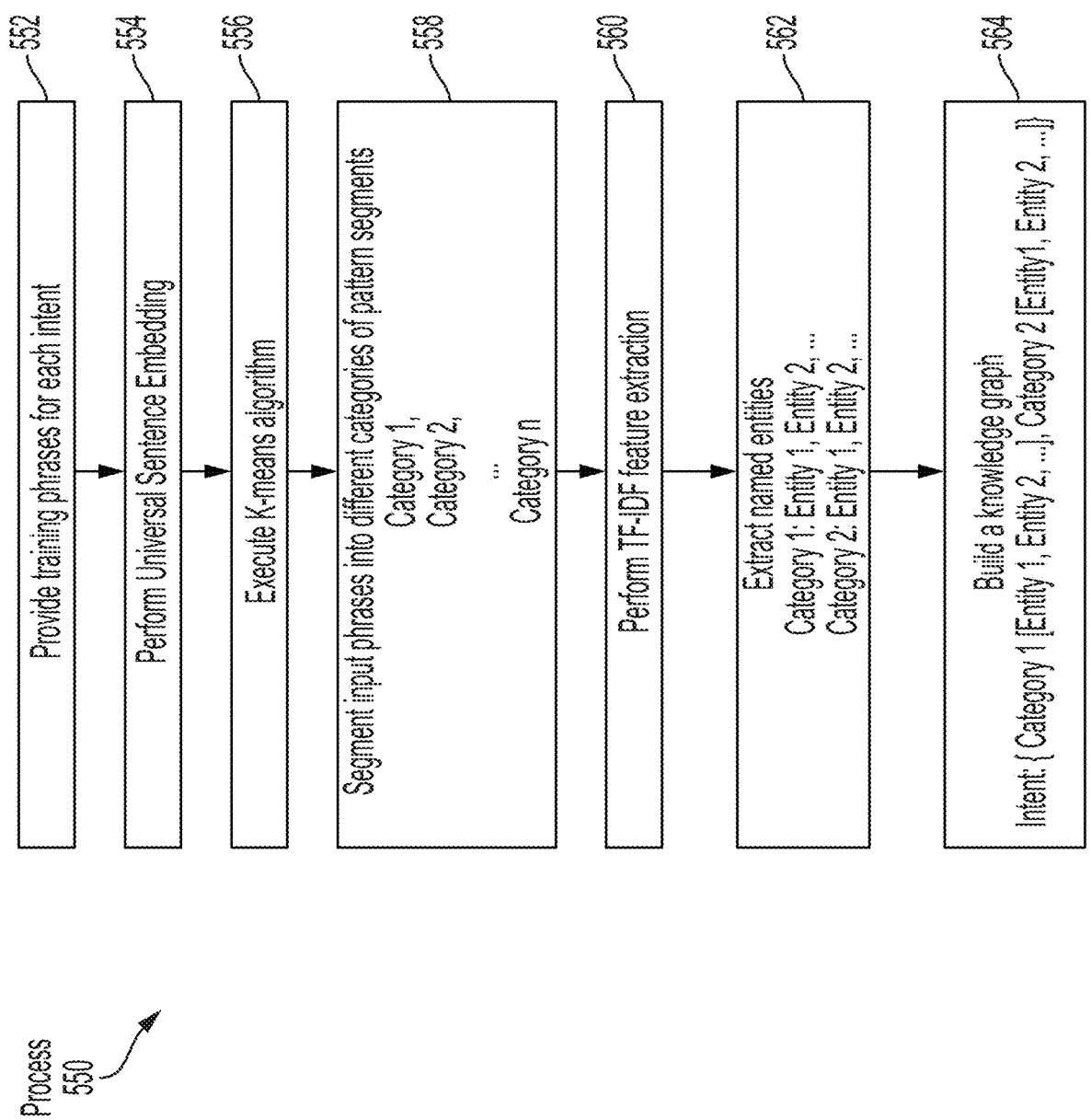
FIG. 5 illustrates an automatic clustering process to extract intent specific taxonomies, according to some embodiments.

FIG. 5 illustrates an automatic clustering process to extract intent specific taxonomies, according to some embodiments, from process 550. The user may provide a plurality of training phrases for each tagged intent in step 552. The system may receive the plurality of training phrases, may learn hierarchical taxonomy from the training phrases, and may create a knowledge graph for intent-based taxonomies into the graph database. A taxonomy, as used throughout this specification, refers to a specific group of content for different categories and tags. Categories are used to separate content into groups of a first level of specificity, and tags are used to provide a second level of specificity.

In some embodiments, the system may perform USE in step 554 and execute a K-means algorithm in step 556. The system may also perform a term frequency-inverse document frequency (TF-IDF) feature extraction in step 560 to extract named entities from one or more taxonomies for each intent. In some embodiments, the system can create a knowledge graph by connecting edges between one or more intent nodes, one or more taxonomy nodes, and one or more named entity nodes. These steps are discussed in more detail below.

In some embodiments, the USE step (step 554) can be used to create a compressed and distributed representation of the input phrase. One or more similarity scores can be calculated among multiple input phrases. For example, the first phrase can be "I want to book a flight from Chicago to Miami tomorrow." The second phrase can be "Please help me reserve a ticket from Chicago to Miami tomorrow," and the third phrase can be "I know how many airlines from Chicago to Miami tomorrow." The USE step can be used to obtain, but is not limited to, 512 and 4096 dimensional embedding vectors and can return the Norm distances of 0.69, 0.84, and 1.10, respectively, of the three embedding vectors; the three embedding vectors can represent the first, second, and third phrases.

In step 556, the system can perform k-means clustering. K-means clustering can be used to find groups that have not been explicitly labeled in the data. K-means clustering can be a post-processing step performed on the embedding vectors to reduce the redundancy for a given data set. In some embodiments, the k-means clustering process can begin by assigning each data point to its nearest centroid point based on Norm distance. The Norm distance can be expressed as:

$$\operatorname{argmin} \operatorname{dist}(Ci, x)^2 \qquad (1)$$

where Ci represents the centroids collection and x represents each data point. The centroids collection Ci can determined by taking the mean of all data points assigned to that centroid's cluster and can be expressed as:

$$Ci = \frac{1}{N} \sum_{i \in N} xi \qquad (2)$$

where N is the number of data points.

In some embodiments, the system can iterate between determining the Norm distance (expression (1)) and the centroids collection (expression (2)) until a stopping criteria is matched. In some embodiments, the stopping criteria may be matched when no data points change clusters or the sum of Norm distances is minimized.

The system then determines the number of clusters K. In some embodiments, increasing the number of clusters K can reduce the distance between data points for each cluster, where the distance is zero when the number of clusters K is equal to the number of data points. To determine the number of clusters, the system calculates the silhouette value for each cluster. The silhouette value can be a measure of how similar an object is to its own cluster compared to others. Specifically, the silhouette value can be expressed as:

$$S(i) = \frac{b(i) - a(i)}{\max\{a(i), b(i)\}} \qquad (3)$$

where a(i) represents the average distance between object's data point i and all other data points within the same cluster, and b(i) represents the smallest average distance of the object's data point i and all data points in other clusters.

In some embodiments, the system can use an Elbow selection method to select the number of clusters K based on the calculated silhouette values of each cluster. Table 3 shown below illustrates exemplary input phrases, along with its corresponding cluster that the system determines the input phrase belongs to after determining the number of clusters K.

TABLE 3

Example k-means clusters

| Cluster No. | Input phrase |
|---|---|
| 1 Connection | What is the shortest connection between [city] and [city]? |
| | Could you give me the shortest connection between [city] and [city]? |
| | Can you find a connection from [city] to [city] at [DateTime]? |
| | What is the next connection from [city] to [city]? |
| | Can you give me a connection from [city] to [city]? |
| | Find connection from [city] to [city] |
| 2 Get From To | What is the shortest way get from [city] to [city]? |
| | How can I get from [city] to [city] as fast as possible? |
| | How can I get to [city] from [city]? |
| | Can you tell me the way get from [city] to [city]? |
| | How can I get to [city]? |
| | How can I get from [city] to [city]? |
| | I want to travel from [city] to [city]. |
| | How do I get to [city]? |
| | How do I get from [city] to [city]? |
| | How can I get from [city] to [city]? |
| 3 From to | To [city] From [city] |
| | From [city] to [city] |
| | I want to go [city]. |
| | [city] to [city] |
| | I want to go [city] from [city]. |
| | I want to go to [city] from [city]. |
| | Take me from [city] to [city] |
| 4 Next | When is the next train from [city] to [city]? |
| | When is the next train to [city]? |
| | When is the next rocket from [city] to [city]? |
| | When is the train from [city] to [city]? |

After clustering, the system can segment the plurality of training phrases into different categories of pattern segments (step 558). The knowledge graph can be a graph database that stores pre-trained knowledge. The pre-knowledge can be generated automatically from tagged intent phrases such as the phrase received at step 552.

To extract features, the system can calculate a TF-IDF score for each feature word (step 560), input phrase, or both. The TF can be determined by how frequent a word appears, e.g., in a given training phrase, divided by the length of the training phrase. The IDF represents how rare the word is across all training phrases and can be determined as the logarithm of the total number of training phrases divided by the number of training phrases having a given word. The TF-IDF score can be determined by TF multiplied by IDF. Table 4 shown below illustrates exemplary TF-IDF scores for exemplary feature words, respectively.

TABLE 4

Example TF-IDF scores for example feature words

| ID | Feature words | TF-IDF score |
|---|---|---|
| 1 | [city, connection] | [0.73, 0.6] |
| 2 | [city, travel] | [0.96, 0.12] |
| 3 | [city] | [0.94] |
| 4 | [city, train, rocket] | [0.76, 0.62, 0.2] |

In some embodiments, the system extracts named entities (step 562). Exemplary named entities from Table 4 can be: [Category 1: city, connection; Category 2: city, travel; Category 3: city; Category 4: city, train, rocket]. For different categories, the system can extract the same word (e.g., intent) as a root intent node and connect it to one or more other nodes in a knowledge graph (in step 564). For example, the system can determine one or more taxonomies from one or more categories and can connect the root intent node to one or more taxonomy nodes, where the one or more taxonomy nodes can correspond to the one or more taxonomies. The system can create the knowledge graph to save and represent the taxonomy.

Figure 6:
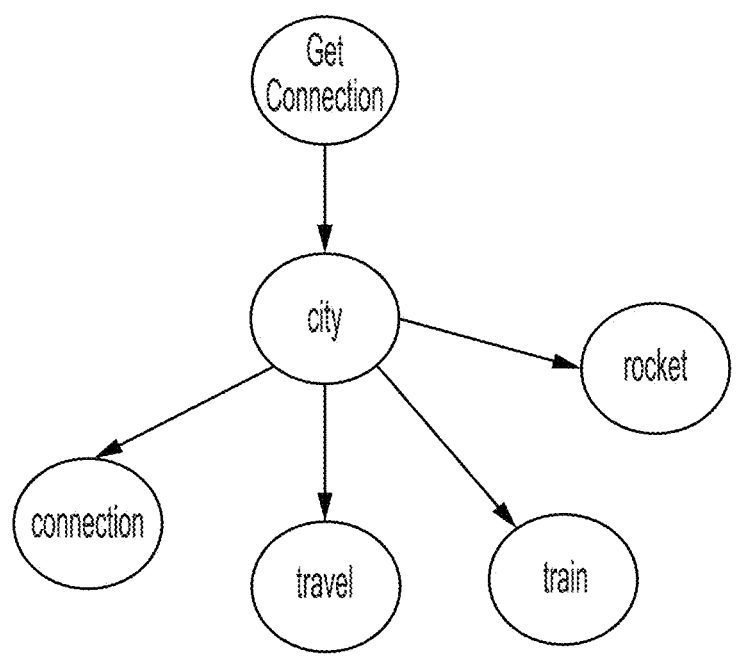
FIG. 6 illustrates an exemplary knowledge graph, according to some embodiments.

An exemplary knowledge graph is illustrated in FIG. 6. For example, the knowledge graph can include an intent node labeled "Get connection;" a taxonomy node labeled "city;" and named entity nodes labeled "connection," "travel," "train," and "rocket." The knowledge graph can further include edges that connect the intent node to the taxonomy node, and the taxonomy node to the named entity nodes.

In some embodiments, certain interdependent words can be related to named entities. Thus, slot trimming can be performed to automatically fit named entities and their semantic relations to one or more trimmed slots. The system can find certain interdependent words and associate them with named entities. For example, for the intent "GetConnection," the system can find the interdependent words "From" and "To" and relate them to "CityName" as one of the named entities. Table 5 shown below illustrates exemplary input phrases and the associated trimmed slots.

TABLE 5

Example slots fillings for example input phrases

| Trimmed slot | Example | Input phrase | Slots fillings |
|---|---|---|---|
| After | After + "to" | When is the next train to Shanghai? | ["City": "Shanghai"] ["Type": "After to"] |
| After nearest | After nearest + "depart" | Depart from LA and to New York | ["City": "LA"] ["Type": "After the nearest depart"] |
| Before | Before + "pm" | I want to go there at 5 pm | ["DateTime": "5 pm"] ["Type": "Before pm"] |

TABLE 5-continued

Example slots fillings for example input phrases

| Trimmed slot | Example | Input phrase | Slots fillings |
|---|---|---|---|
| Before nearest | Before nearest + "arrive" | From LA and arriving to New York | ["City": "LA"] ["Type": "Before the nearest arrive"] |
| Between | Between + "From" + "To" | Flight from New York to LA | ["City": "New York, LA"] ["Type": "Between from to"] |

Exemplary Feature Vector Generation

Figure 7:
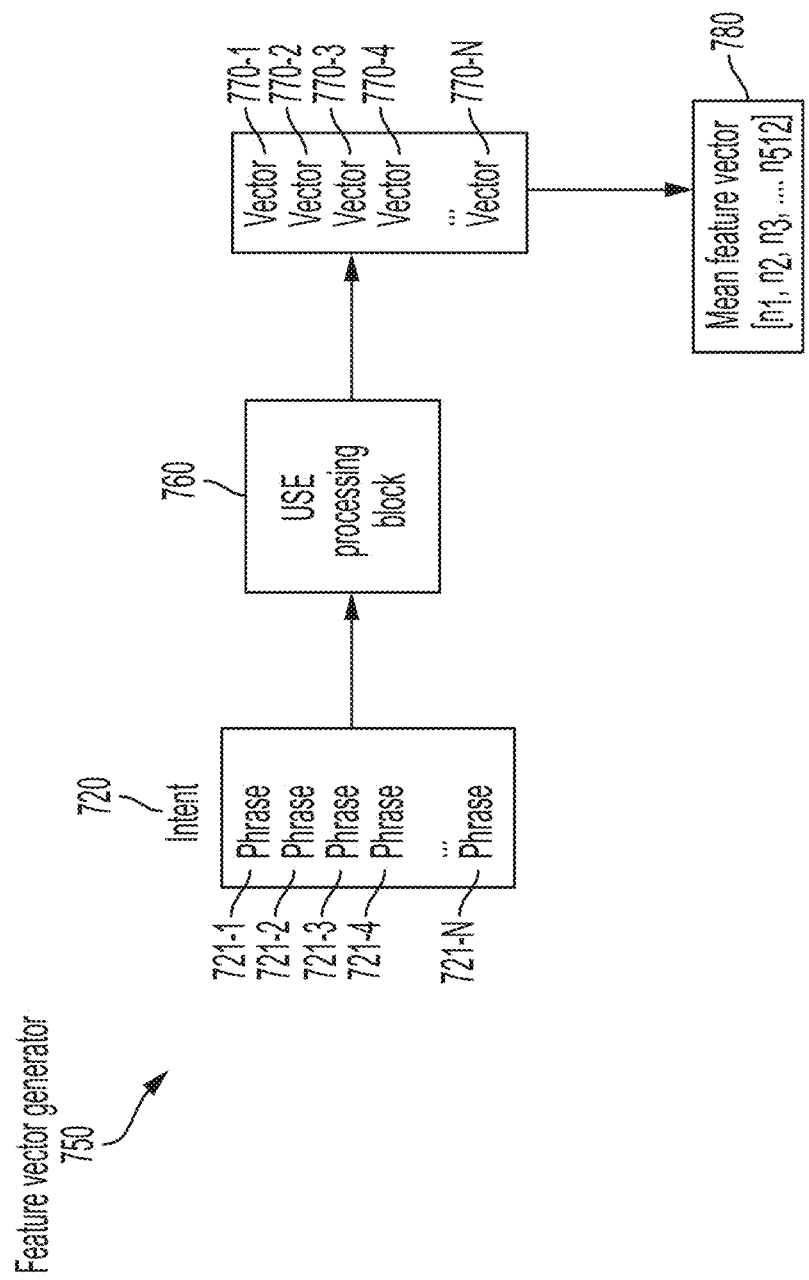
FIG. 7 illustrates an exemplary block diagram representing a process of the feature vector generator, according to some embodiments.

In some embodiments, each intent may have an associated feature vector to represent semantic information. The system may use the feature vector to estimate the intent or topic. In some embodiments, the system may include a feature vector generator 750 (shown in FIG. 1) that uses a pre-trained model to generate a system level encoder and to compute the mean feature vector for each intent. FIG. 7 illustrates an exemplary block diagram representing the process of the feature vector generator, according to some embodiments.

As shown in the figure, an intent 720 can be associated with N number of phrases. The feature vector generator 750 can include a USE processing block 760 that receives the plurality of phrases 721 and generates a plurality of features vectors 770.

In some embodiments, the number of features vectors generated can be equal to the number of phrases N multiplied by a pre-determined number. Exemplary pre-determined numbers can include, but are not limited to, 512 and 4096. The USE processing block 760 may also generate a mean feature vector 780. The feature vectors 770 can be used to represent semantic information in a phrase 721, where the semantic information can be used to extract the user's intent. The mean feature vector 780 can be a vector of mean values representative of the individual feature vectors 770.

In some embodiments, the feature vector generator 750 can generate a plurality of features vectors 770 for each intent 720.

Exemplary Intent Determiner

Figure 8A:
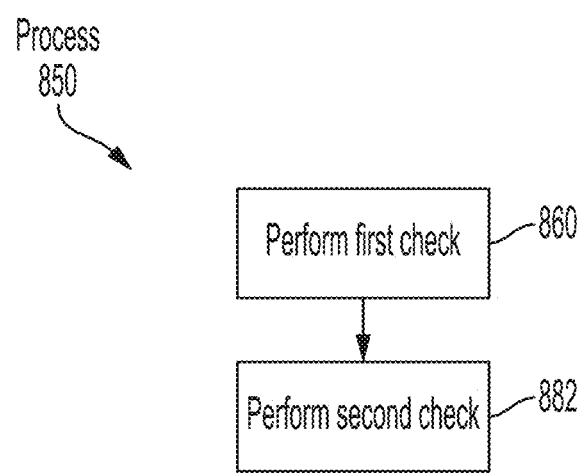
FIG. 8A illustrates an exemplary method for determining an intent of a user input phrase, according to some embodiments.

The system may use a multi-step intent detection strategy, as shown in process 850 of FIG. 8A. Process 850 can include performing a first check in step 860 and performing a second check in step 882, both of which are discussed in more detail below. In some embodiments, the process 850 may be used at runtime after the system has created the knowledge graph.

Figure 8B:
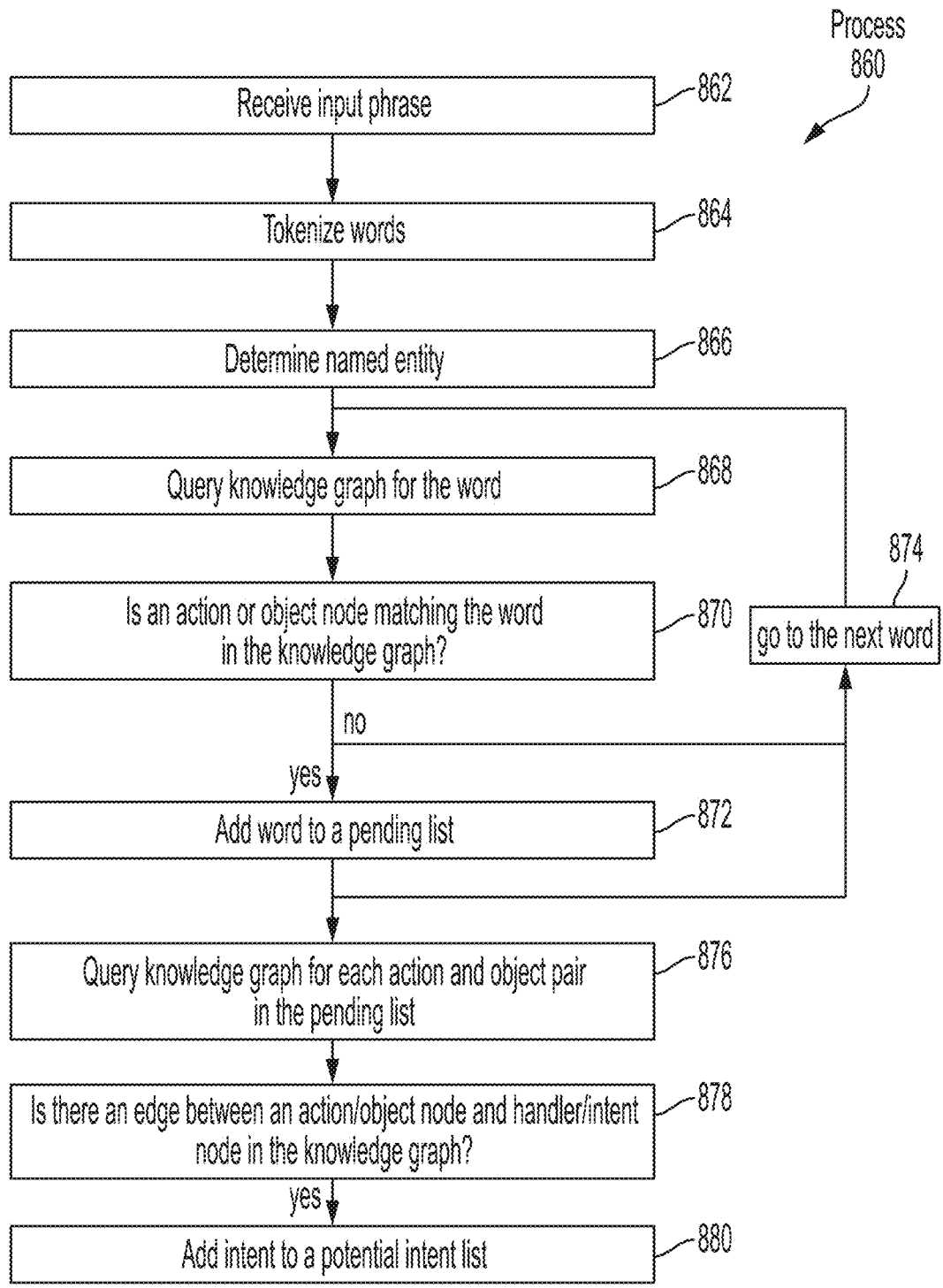
FIG. 8B illustrates an exemplary method for performing a first check for the intent determiner, according to some embodiments.

FIG. 8B illustrates an exemplary method for performing a first check for intent determination, according to some embodiments. The first check can be performed to search the knowledge graph for all potential intent nodes. Process 860 can include receiving the input phrase in step 862. In step 864, the system can tokenize the phrase. In some embodiments, the method performed in step 864 can be similar to the methods performed in steps 254 and 256 (discussed above). Step 866 can include using named entity recognition to extract out action and object words. Step 866 may be similar to steps 258 and 260, discussed above.

In step 868, the system may search the knowledge graph (e.g., knowledge graph 600) for a given word. In some embodiments, the system may also search the knowledge graph for N-gram words. If there is an action node (e.g., action node 424A), action item node (e.g., action item node 424A-1, 424A-2, or 424A-3), an object node (e.g., object node 424O), or an object item node (e.g., object item node 424O-1, 424O-2, or 424O-3) in the knowledge graph that matches the word, then the system can add the word to a pending list (step 872). If there is no match, the system does not add the word to the pending list. The process then moves on to the next word in step 874 and repeats steps 868, 870, and possibly 872 until the knowledge graph has been queried for all words in the phrase.

The process proceeds to step 876 when all words in the phrase have been analyzed. In step 876, the system queries the knowledge graph for each entry (action and object pair) included in the pending list. If there are one or more edges (e.g., edges 432A and 431A, edges 432O and 431O, etc.) in the knowledge graph that connects a matched action node, action item node, object node, or object item node to the intent node (e.g., node 420) (step 878), then the intent is added to a potential intent list (step 880).

Figure 8C:
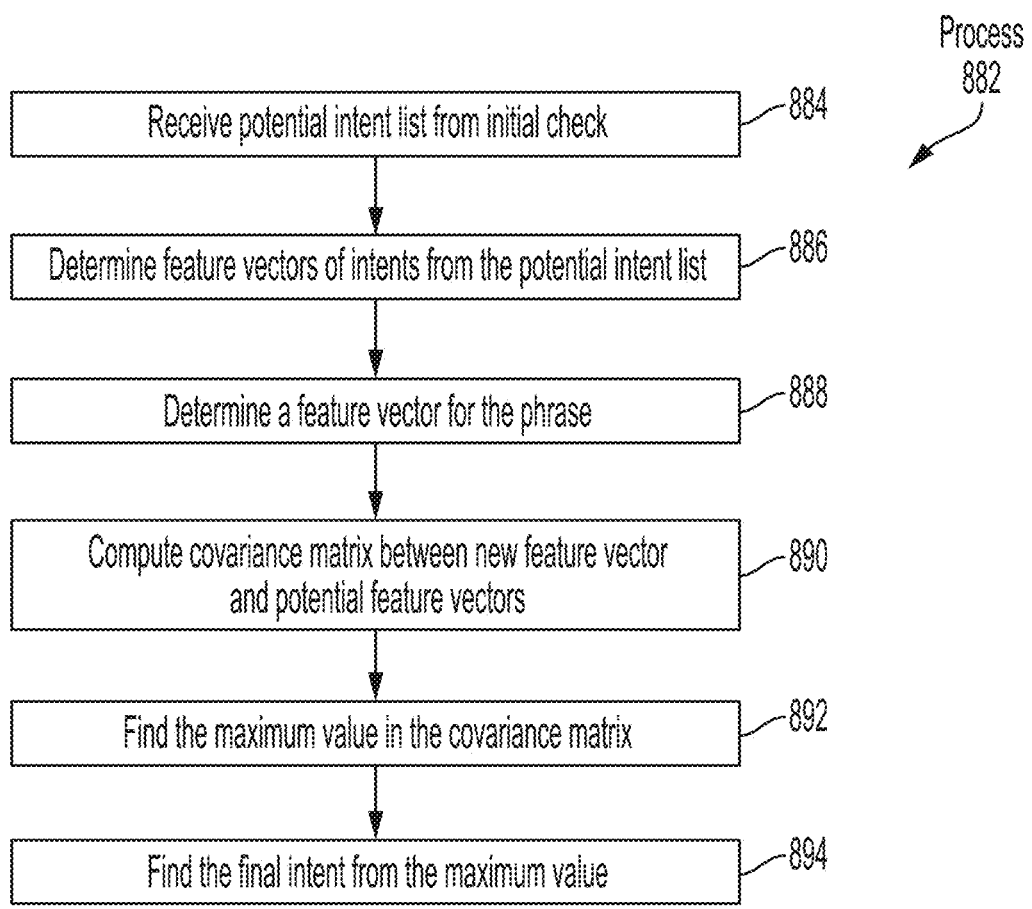
FIG. 8C illustrates an exemplary method for performing a second check for intent determination, according to some embodiments.

FIG. 8C illustrates a method for performing a second check for intent determination, according to some embodiments. The second check can be performed by computing a covariance matrix and returning a final intent using the covariance matrix. Process 882 can include, in step 884, receiving the potential intent list from the first check process 860 (of FIG. 8B).

In step 886, the system may determine one or more feature vectors for each entry (intent) from the potential intent list. The system may also determine the feature vector of the input phrase (step 888). In some embodiments, the system may use the feature vector generator 750 for step 886, step 888, or both.

Using the feature vectors returned from step 886 and the computed feature vector from step 888, the system may compute a covariance matrix in step 890. The covariance matrix may be used to represent the relationships between the potential intents and the input phrase.

The system may use the covariance matrix to find the maximum value (step 892). In some embodiments, the maximum value may correspond to an element from the first row of the covariance matrix, which may be referred to as the maximum element. The system may then find the final intent by using the index of the maximum element (step 894).

In instances where the intent of the user input phrase is not one that matches an intent node in the knowledge graph, the system may automatically add the intent node to the knowledge graph. For example, the system may determine that the potential intent list is empty at the end of step 880, which may indicate that the intent does not exist in the knowledge graph. The system may automatically expand its intent capabilities by adding a corresponding intent node 420 to the knowledge graph 400 in accordance with the determination that the potential intent list is empty. In some embodiments, when the system determines the knowledge graph does not include the intent of the user input phrase, the system may skip performing the second check in step 882. In some embodiments, the system may also add action nodes, action item nodes, object nodes, object item nodes, entity nodes, entity item nodes, and/or edges corresponding to the added intent to the knowledge graph.

In some embodiments, the above-disclosed processes (e.g., process 250, process 350, process 850, etc.) can be run locally on a device (e.g., mobile phone, tablet, laptop, etc.), on a central device (e.g., a server), or in a cloud environment.

Exemplary Computing Device

Figure 9:
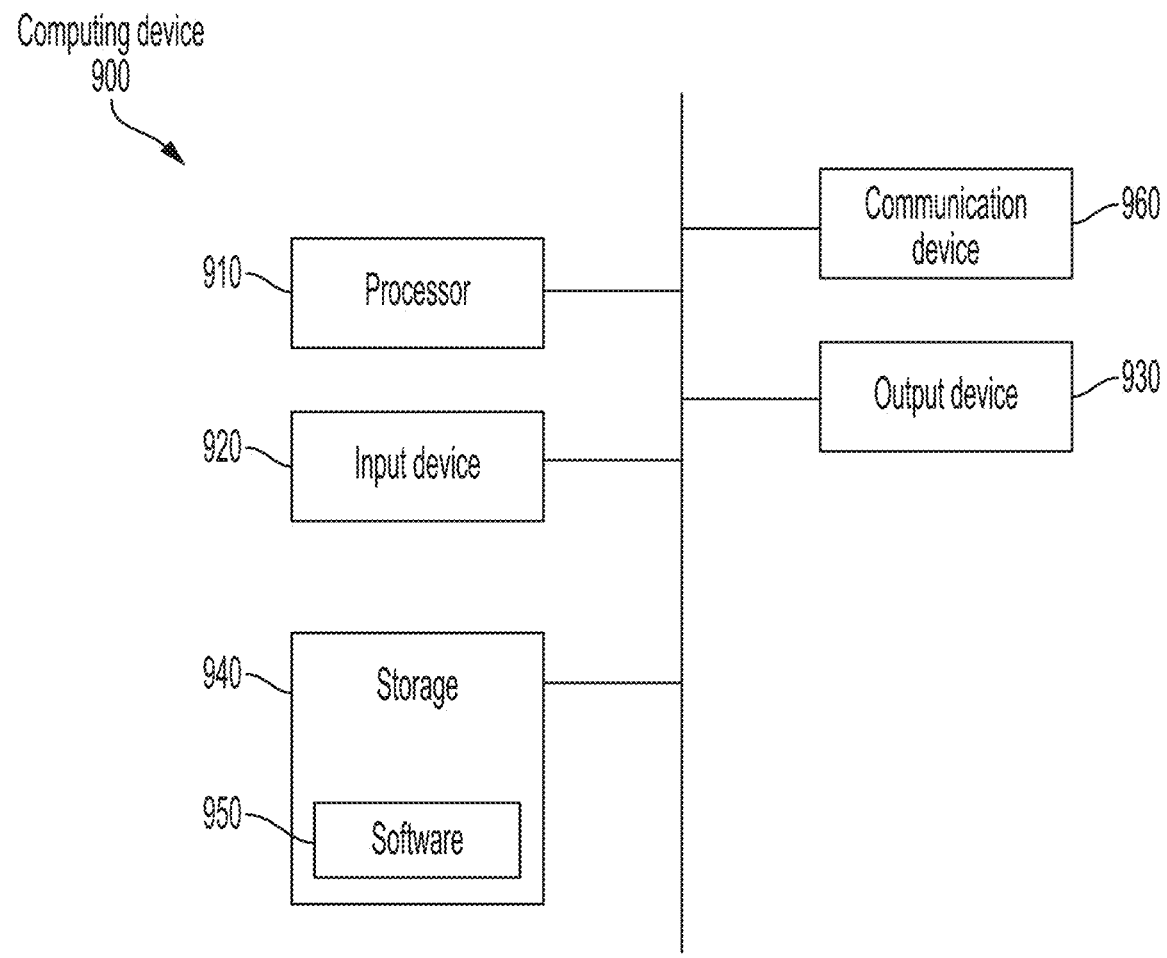
FIG. 9 illustrates an exemplary computing device, according to some embodiments.

FIG. 9 illustrates an exemplary a computing device, according to some embodiments. Device 900 can be a host computer connected to a network. Device 900 can be a client computer or a server. As shown in FIG. 9, device 900 can be any suitable type of microprocessor-based device, such as a personal computer, work station, server, or handheld computing device (portable electronic device) such as a phone or tablet. The device can include, for example, one or more of processor 910, input device 920, output device 930, storage 940, and communication device 960. Input device 920 and output device 930 can generally correspond to those described above and can either be connectable or integrated with the computer.

Input device 920 can be any suitable device that provides input, such as a touchscreen, keyboard or keypad, mouse, or voice-recognition device. Output device 930 can be any suitable device that provides output, such as a touchscreen, haptics device, or speaker.

Storage 940 can be any suitable device that provides storage, such as an electrical, magnetic, or optical memory including a RAM, cache, hard drive, or removable storage disk. Communication device 960 can include any suitable device capable of transmitting and receiving signals over a network, such as a network interface chip or device. The components of the computer can be connected in any suitable manner, such as via a physical bus, or wirelessly.

Software 950, which can be stored in storage 940 and executed by processor 910, can include, for example, the programming that embodies the functionality of the present disclosure (e.g., as embodied in the devices described above).

Software 950 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by or in connection with an instruction-execution system, apparatus, or device.

Software 950 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for training and applying a knowledge graph data structure for a spoken language understanding (SLU) system, the method performed by a system comprising one or more processors, the method comprising:
   receiving input training data representing one or more phrases;
   training a knowledge graph data structure, the training comprising:
      extracting word data representing one or more words from the input training data representing one or more phrases;
      generating and storing, based on the word data representing the one or more words, a named entity node in the knowledge graph data structure;
      generating taxonomy data representing one or more categories in which the one or more phrases of the input training data can be segmented;
      generating and storing, based on the taxonomy data, a taxonomy node in the knowledge graph data structure;

generating intent data based on the input training data representing the one or more phrases;

generating and storing, based on the intent data, an intent node in the knowledge graph; and generating and storing a first edge and a second edge in the knowledge graph, wherein the first edge forms a first connection between the named entity node and the taxonomy node, and the second edge forms a second connection between the taxonomy node and the intent node;

receiving user input phrase data; and applying one or more data processing operations, based at least in part on the user input phrase data and the trained knowledge graph data structure comprising the named entity node, the taxonomy node, the intent node, the first edge, and the second edge, to generate output data representing a final intent of the user input phrase data, wherein the one or more data processing operations comprises:

determining one or more potential intents of the user input phrase data; and based on the determined one or more potential intents and using a covariance matrix, determine the final intent of the user input phrase data, wherein the final intent of the user input phrase data is determined based on a maximum value of the covariance matrix.

2. The method of claim 1, further comprising:

receiving second user input phrase data;

determining whether the knowledge graph data structure includes an intent node corresponding to the second user input phrase data; and in accordance with the determination that the knowledge graph data structure does not include the intent node corresponding to the second user input phrase data, adding the intent node and adding one or more additional nodes representative of words in the second user input phrase to the knowledge graph data structure.

3. The method of claim 1, wherein the training of the knowledge graph data structure comprises:

for each of the one or more phrases in the input training data:

performing lemmatization on the respective phrase to reduce the phrase;

tagging parts of speech in the reduced phrase;

extracting action words and forming an action list;

extracting object words and forming an object list; and generating and storing one or more nodes in the knowledge graph data structure corresponding to the extracted action words and the extracted object words.

4. The method of claim 1, wherein the named entity node is of a type selected from the group of nodes comprising: action nodes corresponding to action words or object nodes corresponding to object words.

* * * * *